United States Patent
Lu et al.

(10) Patent No.: US 10,606,119 B2
(45) Date of Patent: Mar. 31, 2020

(54) COLOR FILTER SUBSTRATE COMPRISING FIRST, SECOND, AND THIRD PIXEL UNITS EACH HAVING COLOR FILTERS WITH DIFFERENT AREAS, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Kun Lu, Beijing (CN); Shiqing Ma, Beijing (CN); Ling Bai, Beijing (CN); Hui Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/714,114

(22) Filed: Sep. 25, 2017

(65) Prior Publication Data

US 2018/0095322 A1   Apr. 5, 2018

(30) Foreign Application Priority Data

Sep. 30, 2016   (CN) .......................... 2016 1 0873684

(51) Int. Cl.
*G02F 1/1335* (2006.01)
*G02B 5/20* (2006.01)
*F21V 8/00* (2006.01)

(52) U.S. Cl.
CPC ....... *G02F 1/133514* (2013.01); *G02B 5/201* (2013.01); *G02B 6/005* (2013.01);
(Continued)

(58) Field of Classification Search
CPC .. G02B 6/0013; G02B 6/0066; G02B 6/0026; G02F 2201/52
See application file for complete search history.

(56) References Cited

U.S. PATENT DOCUMENTS

| 7,133,093 B2 * | 11/2006 | Ochiai | ................. | G02B 6/0068 349/70 |
| 8,767,137 B2 * | 7/2014 | Hiyama | .................. | G02F 1/136 349/109 |

(Continued)

FOREIGN PATENT DOCUMENTS

| CN | 102681247 A | 9/2012 |
| CN | 202649645 U | 1/2013 |

(Continued)

OTHER PUBLICATIONS

First Office Action dated Jan. 22, 2019 corresponding to Chinese application No. 201610873684.5.

*Primary Examiner* — Paul C Lee
(74) *Attorney, Agent, or Firm* — Nath, Goldberg & Meyer; Joshua B. Goldberg; Daniel Bissing

(57) ABSTRACT

The application discloses a color filter substrate, an array substrate, a display panel and a display device. The color filter substrate comprises a first base substrate and a plurality of pixel units provided above the first base substrate, each of the pixel units comprising color filters of various colors; from a pixel unit close to a first side of the first base substrate towards a pixel unit close to a second side of the first base substrate opposite to the first side, a ratio of an area of a color filter of a specific color to that of any one of color filters of other colors is increased gradually. In the application, the color filter of the specific color is able to compensate for the color shift of the light guide plate, alleviating the color shift of the display device, and thereby improving the image quality of the display device.

17 Claims, 4 Drawing Sheets

(52) U.S. Cl.
CPC ......... *G02B 6/0013* (2013.01); *G02B 6/0066* (2013.01); *G02F 1/133603* (2013.01); *G02F 1/133615* (2013.01); *G02B 6/0026* (2013.01); *G02B 6/0068* (2013.01); *G02F 2201/52* (2013.01)

(56) References Cited

U.S. PATENT DOCUMENTS

| | | | | |
|---|---|---|---|---|
| 8,809,866 | B2 * | 8/2014 | Iwasaki | H01L 33/08 257/72 |
| 8,810,129 | B2 * | 8/2014 | Shiratori | H01L 27/3216 313/498 |
| 2004/0125278 | A1 | 7/2004 | Park et al. | |
| 2007/0121039 | A1 * | 5/2007 | Tago | G02F 1/133371 349/114 |
| 2009/0109358 | A1 * | 4/2009 | Tanaka | G02F 1/134363 349/38 |
| 2010/0117528 | A1 * | 5/2010 | Fukuda | H01L 27/322 313/505 |
| 2010/0253222 | A1 * | 10/2010 | Koshihara | H01L 51/5265 315/32 |
| 2011/0149213 | A1 * | 6/2011 | Han | G02F 1/133514 349/106 |

FOREIGN PATENT DOCUMENTS

| | | |
|---|---|---|
| CN | 104317099 A | 1/2015 |
| CN | 105807477 A | 7/2016 |
| TW | 200411231 A | 7/2004 |

\* cited by examiner

COLOR FILTER SUBSTRATE COMPRISING FIRST, SECOND, AND THIRD PIXEL UNITS EACH HAVING COLOR FILTERS WITH DIFFERENT AREAS, DISPLAY PANEL AND DISPLAY DEVICE

CROSS-REFERENCE TO RELATED APPLICATION

The present application claims priority to Chinese Patent Application No. 201610873684.5 filed on Sep. 30, 2016, the disclosure of which is hereby incorporated by reference in its entirety.

TECHNICAL FIELD

The present application relates to the field of display technology, more particularly, to a color filter substrate, an array substrate, a display panel, and a display device.

BACKGROUND

With the development of display technology, liquid crystal display devices are more widely used. Generally, a liquid crystal display device employs an edge type backlight device which typically comprises a light guide plate and a light source at a side of the light guide plate. The material of the light guide plate generally absorbs selectively the blue light in the white light, so that more blue light remaining at the light incoming side of the light guide plate than that at the side far from the light source. Thus, the light incoming side of the light guide plate is blueish while the side far from the light source is yellowish, resulting in a color shift phenomenon, and thereby degrading the image quality of the display device.

SUMMARY

The present application provides a color filter substrate, an array substrate, a display panel, and a display device for improving image quality of the display device.

In order to achieve the above object, the present application provides a color filter substrate comprising a first base substrate and a plurality of pixel units provided above the first substrate, each of the pixel units comprising color filters of various colors; from a pixel unit close to a first side of the first base substrate towards a pixel unit close to a second side of the first base substrate opposite to the first side, a ratio of an area of a color filter of a specific color to that of any one of color filters of other colors is increased gradually.

Optionally, from the pixel unit close to the first side of the first base substrate towards the pixel unit close to the second side of the first base substrate, the area of the color filter of the specific color is increased gradually.

Optionally, in the pixel unit close to the first side of the first base substrate, the area of the color filter of the specific color is smaller than that of any one of the color filters of other colors.

Optionally, in the pixel unit close to the first side of the first base substrate, the ratio of the area of the color filter of the specific color to that of any one of the color filters of other colors is smaller than 1 and larger than or equal to 0.94.

Optionally, in the pixel unit close to the second side of the first base substrate, the area of the color filter of the specific color is larger than that of any one of the color filters of other colors.

Optionally, in the pixel unit close to the second side of the first base substrate, the ratio of the area of the color filter of the specific color to that of any one of the color filters of other colors is larger than 1 and smaller than or equal to 1.07.

Optionally, a ratio of an area of a blue color filter close to the first side to that of a blue color filter close to the second side is 1:1.138.

Optionally, from the pixel unit close to the first side of the first base substrate towards the pixel unit close to the second side of the first base substrate, the area of any one of the color filters of other colors is decreased gradually.

Optionally, in the pixel unit close to the first side of the first base substrate, the area of any one of the color filters of other colors is larger than that of the color filter of the specific color.

Optionally, in the pixel unit close to the first side of the first base substrate, the ratio of the area of the color filter of the specific color to that of any one of the color filters of other colors is smaller than 1 and larger than or equal to 0.94.

Optionally, in the pixel unit close to the second side of the first base substrate, the area of any one of the color filters of other colors is smaller than that of the color filter of the specific color.

Optionally, in the pixel unit close to the second side of the first base substrate, the ratio of the area of the color filter of the specific color to that of any one of the color filters of other colors is larger than 1 and smaller than or equal to 1.07.

Optionally, in a pixel unit located midway between the first side and the second side, an area of a color filter of the specific color is equal to that of any one of the color filters of other colors.

Optionally, the color filter of the specific color is a blue color filter.

Optionally, the color filters of various colors also comprise a green color filter and a red color filter.

Optionally, an area of the red color filter is equal to that of the green color filter.

In order to achieve the above object, the present application provides an array substrate comprising a second base substrate and a plurality of pixel units provided above the second base substrate, each of the pixel units comprising color filters of various colors; from a pixel unit close to a first side of the second base substrate towards a pixel unit close to a second side of the second base substrate opposite to the first side, a ratio of an area of a color filter of a specific color to that of any one of color filters of other colors is increased gradually.

In order to achieve the above object, the present application provides a display panel comprising an array substrate and the color filter substrate of claim 1 arranged opposite to each other.

In order to achieve the above object, the present application provides a display device comprising a backlight assembly and the display panel of claim 16, the backlight assembly comprising a light source and a light guide plate, the light source being located at a light incoming side of the light guide plate;

in a case that the color filter substrate is the color filter substrate of claim 1, the light incoming side of the light guide plate is arranged so as to correspond to the first side of the first base substrate.

Optionally, the material of the light guide plate is PMMA.

DETAILED DESCRIPTION

In order that the technical solutions of the present application may be understood well by a person skilled in the art, detailed description will be made bellow to the color filter substrate, the array substrate, the display panel and the display device provided by the present application in conjunction with accompanying drawings.

Figure 1:
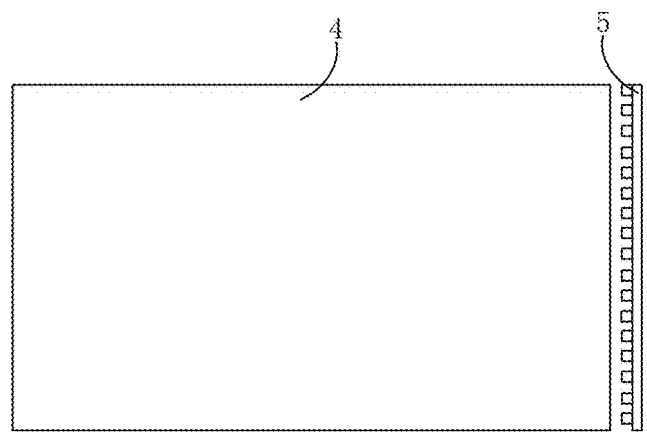
FIG. 1 is a structural diagram of an edge type backlight device in the prior art.

FIG. 1 is a structural diagram of an edge type backlight device in the prior art. As shown in FIG. 1, the edge type backlight device comprises a light guide plate 4 and a light source 5 located at a side of the light guide plate 4. The light guide plate 4 functions to cause a linear light source generated by the light source 5 to become a planar light source so as to meet the operational requirement for the liquid crystal device, wherein the light source may be a light emitting diode (LED) light bar.

Figure 2:
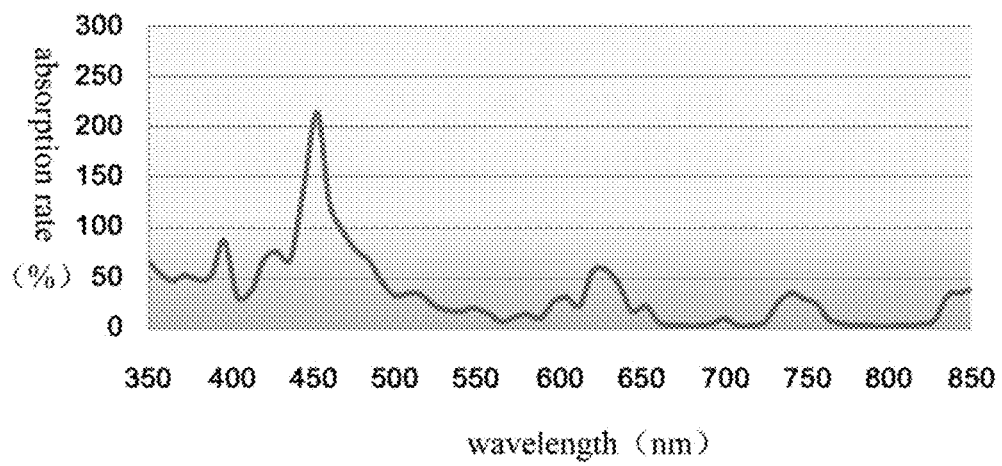
FIG. 2 is a diagram of absorption spectrum of a light guide plate in FIG. 1.

A material of the light guide plate 4 is Polymethylmethacrylate (PMMA). Due to the inherent nature of this material, a blue light in a white light will be absorbed selectively by the light guide plate 4 during the propagation of the white light emitted by the light source 5 through the light guide plate 4. FIG. 2 is a diagram of absorption spectrum of the light guide plate in FIG. 1. As shown in FIG. 2, the absorption rate for the blue light with a wavelength of around 450 nm absorbed by the light guide plate 4 is higher. A side of the light guide plate 4 close to the light source 5 is a light incoming side, and a side of the light guide plate 4 away from the light source 5 is a side far from the light source. The white light emitted by the light source enters into the light incoming side of the light guide plate 4 and propagates to the side far from the light source through the light guide plate 4. Since the blue light in the white light is continuously absorbed when the white light is propagating in the light guide plate 4, the blue light in the white light is continuously reduced during the propagation of the white light from the light incoming side towards the side far from the light source, which results in that there is more blue light remaining at the light incoming side than the side far from the light source of the light guide plate 4. Thus, the light incoming side of the light guide plate 4 is blueish while the side far from the light source is yellowish, resulting in a color shift phenomenon, and thereby degrading image quality of the display device.

Figure 3:
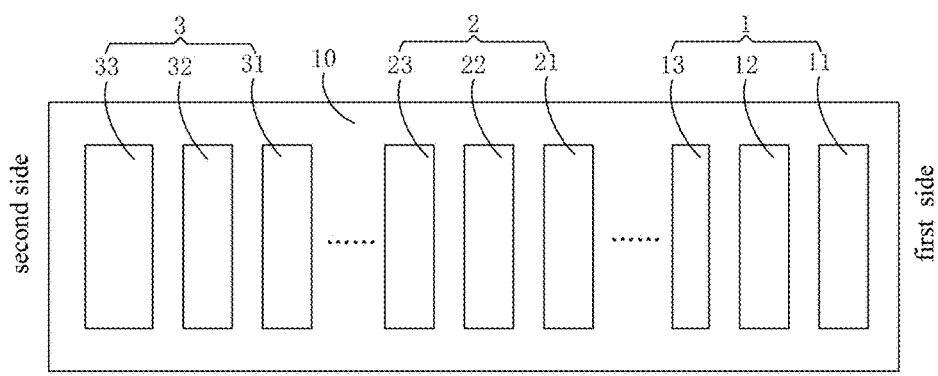
FIG. 3 is a structural diagram of a color filter substrate provided by a first embodiment of the present application.

FIG. 3 is a structural diagram of a color filter substrate provided by the first embodiment of the present application. As shown in FIG. 3, the color filter substrate comprises a first base substrate 10 and a plurality of pixel units provided above the first base substrate 10, each of the pixel units comprising color filters of various colors; from a pixel unit close to a first side of the first base substrate towards a pixel unit close to a second side of the first base substrate opposite to the first side, a ratio of an area of a color filter of a specific color to that of any one of color filters of other colors is increased gradually.

The color filters of various colors provided above the first base substrate 10 form a plurality of pixel units, each of the pixel units comprising color filters of different colors. A color filter may be a red color filter, a blue color filter or a green color filter, and thus each pixel unit may comprise a red color filter, a green color filter and a blue color filter. In FIG. 1, description is made by taking three columns of the pixel units as an example, wherein only one pixel unit is illustrated in each column, and the three pixel units are a pixel unit 1, a pixel unit 2 and a pixel unit 3, respectively. The pixel unit 1 is close to the first side of the first base substrate 10, the pixel unit 3 is close to the second side of the first base substrate 10, and the pixel unit 2 is located between the pixel unit 1 and the pixel unit 3. For example, the pixel unit 2 is located in the mid way between the first side and the second side of the first base substrate 10. The pixel unit 1 comprises a red color filter 11, a green color filter 12 and a blue color filter 13; the pixel unit 2 comprises a red color filter 21, a green color filter 22 and a blue color filter 23; and the pixel unit 3 comprises a red color filter 31, a green color filter 32 and a blue color filter 33.

By way of an example, if the color filter of the specific color is the blue color filter, then any one of the color filters of other colors is the red color filter or the green color filter. As shown in FIG. 3, the blue color filter 13 is close to the first side of the first base substrate 10, the blue color filter 33 is close to the second side of the first base substrate 10, and the blue color filter 23 is located in the mid way between the first side and the second side of the first base substrate 10.

In the present embodiment, from the pixel unit close to the first side of the first base substrate 10 towards the pixel unit close to the second side of the first base substrate 10, the area of the color filter of the specific color therein is increased gradually. As shown in FIG. 3, an area of a blue color filter is increased gradually from the blue color filter 13 in the pixel unit 1 towards the blue color filter 33 in the pixel unit 3. Specifically, the area of the blue color filter 13 in the pixel unit 1 is smaller than that of the blue color filter 23 in the pixel unit 2, and the area of the blue color filter 23 in the pixel unit 2 is smaller than that of the blue color filter 33 in the pixel unit 3.

In the pixel unit close to the first side of the first base substrate 10, the area of the color filter of the specific color is smaller than that of any one of the color filters of other colors. In the present embodiment, the areas of the color filters of other colors in different pixel units may be the same. As shown in FIG. 3, the red color filter 11, the red color filter 21, the red color filter 31, the green color filter 12, the green color filter 22 and the green color filter 32 have the same area. Thus, in the pixel unit 1 close to the first side of the first base substrate 10, the area of the blue color filter 13 is smaller than that of the red color filter 11 and smaller than that of the green color filter 12. For example, in the pixel unit 1 close to the first side of the first base substrate 10, the ratio of the area of the color filter of the specific color to that of any one of the color filters of other colors is smaller than 1 and larger than or equal to 0.94. As shown in FIG. 3, in the pixel unit 1 close to the first side of the first base substrate 10, the ratio of the area of the blue color filter 13 to that of the red color filter 11 is smaller than 1 and larger than or equal to 0.94, and the ratio of the area of the blue color filter 13 to that of the green color filter 12 is smaller than 1 and larger than or equal to 0.94.

In the pixel unit close to the second side of the first base substrate 10, the area of the color filter of the specific color is larger than that of any one of the color filters of other colors. As shown in FIG. 3, in the pixel unit 3 close to the second side of the first base substrate 10, the ratio of the area of the blue color filter 33 to that of the red color filter 31 is larger than 1 and smaller than or equal to 1.07, and the ratio of the area of the blue color filter 33 to that of the green color filter 32 is larger than 1 and smaller than or equal to 1.07.

In the pixel unit located midway between the first side and the second side, the area of a color filter of the specific color is equal to that of any one of the color filters of other colors. As shown in FIG. 3, in the pixel unit 2 located midway between the first side and the second side, the area of the blue color filter 23 is equal to that of the red color filter 21, and equal to that of the green color filter 22.

To sum up, an area of a blue color filter is increased gradually from the blue color filter 13 in the pixel unit 1 close to the first side of the first base substrate 10 towards the blue color filter 33 in the pixel unit 3 close to the second side of the first base substrate 10, while the areas of the red color filters and the green color filters in the pixel units are equal to each other (i.e., the area of a color filter of any other color remains unchanged). Therefore, it is achieved that the ratio of the area of the blue color filter to that of the red color filter is increased gradually and the ratio of the area of the blue color filter to that of the green color filter is increased gradually, from the pixel unit 1 close to the first side of the first base substrate 10 towards the pixel unit 3 close to the second side of the first base substrate 10 opposite to the first side.

In the present embodiment, when the color filter substrate is applied to the light guide plate, the area of the blue color filter is increased gradually from the first side of the first base substrate 10 (the light incoming side of the light guide plate) towards the second side of the first base substrate 10 (the side of the light guide plate far from the light source). Thus, the transmittance of the blue light is increased gradually, which compensates for the color shift of the light guide plate, and thereby alleviating the color shift phenomenon of a display device.

It should be noted that, in the present embodiment, the area of the color filter of the specific color in the pixel unit located at a middle position is set to be equal to the area of any one of the color filters of other colors; and on that basis, in order to ensure that the ratio of the area of the color filter of the specific color to that of any one of the color filters of other colors is increased gradually, the area of the color filter of the specific color in the pixel unit close to the first side is set to be smaller than the area of any one of the color filters of other colors, and the area of the color filter of the specific color in the pixel unit close to the second side is set to be larger than the area of any one of the color filters of other colors, and thereby achieving the compensation for the color shift of the light guide plate. In a practical application, the area of the color filter of the specific color may be set in other ways, as long as it can ensure that the ratio of the area of the color filter of the specific color to that of any one of the color filters of other colors is increased gradually, and it will not be enumerated here.

In the technical solution of the color filter substrate provided by the present embodiment, from a pixel unit close to a first side of the first base substrate towards a pixel unit close to a second side of the first base substrate opposite to the first side, a ratio of an area of a color filter of a specific color to that of any one of color filters of other colors is increased gradually, thereby the color filter of the specific color compensates for the color shift of the light guide plate, alleviating the color shift phenomenon of a display device, and thus improving the image quality of the display device.

Figure 4:
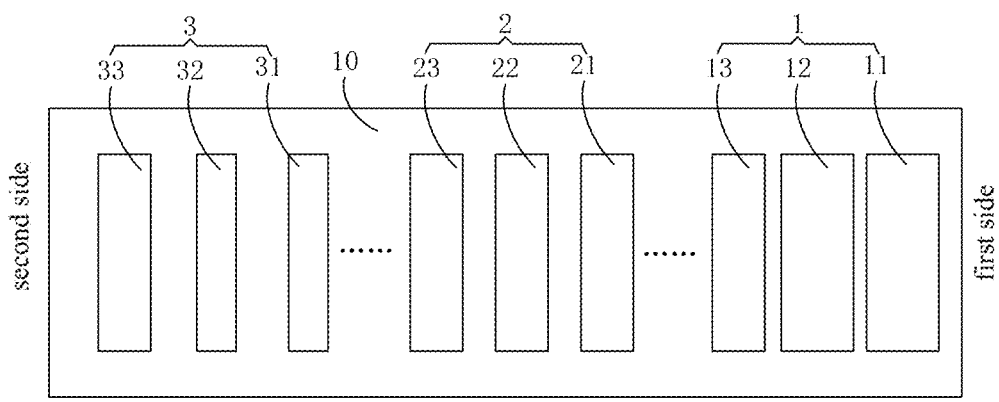
FIG. 4 is a structural diagram of a color filter substrate provided by a second embodiment of the present application.

FIG. 4 is a structural diagram of a color filter substrate provided by the second embodiment of the present application. As shown in FIG. 4, the color filter substrate comprises a first base substrate 10 and a plurality of pixel units provided above the first base substrate 10, each of the pixel units comprising color filters of various colors; from a pixel unit close to a first side of the first base substrate towards a pixel unit close to a second side of the first base substrate opposite to the first side, a ratio of an area of a color filter of a specific color to that of any one of color filters of other colors is increased gradually.

The color filters of various colors provided above the first base substrate 10 form a plurality of pixel units, each of the pixel units comprising color filters of different colors. A color filter may be a red color filter, a blue color filter or a green color filter, and thus each pixel unit may comprise a red color filter, a green color filter and a blue color filter. In FIG. 4, description is made by taking three columns of the pixel units as an example, wherein only one pixel unit is illustrated in each column, and the three pixel units are a pixel unit 1, a pixel unit 2 and a pixel unit 3, respectively. The pixel unit 1 is close to the first side of the first base substrate 10, the pixel unit 3 is close to the second side of the first base substrate 10, and the pixel unit 2 is located between the pixel unit 1 and the pixel unit 3. For example, the pixel unit 2 is located in the mid way between the first side and the second side of the first base substrate 10. The pixel unit 1 comprises a red color filter 11, a green color filter 12 and a blue color filter 13; the pixel unit 2 comprises a red color filter 21, a green color filter 22 and a blue color filter 23; and the pixel unit 3 comprises a red color filter 31, a green color filter 32 and a blue color filter 33.

By way of an example, if the color filter of the specific color is the blue color filter, then any one of the color filters of other colors is the red color filter or the green color filter. As shown in FIG. 4, the blue color filter 13 is close to the first side of the first base substrate 10, the blue color filter 33 is close to the second side of the first base substrate 10, and the blue color filter 23 is located in the mid way between the first side and the second side of the first base substrate 10.

In the present embodiment, from the pixel unit close to the first side of the first base substrate 10 towards the pixel unit close to the second side of the first base substrate 10, the area of any one of the color filters of other colors is decreased gradually. As shown in FIG. 4, an area of a red color filter is decreased gradually from the red color filter 1 in the pixel unit 1 towards the red color filter 31 in the pixel unit 3, and an area of a green color filter is decreased gradually from the green color filter 12 in the pixel unit 1 towards the green color filter 32 in the pixel unit 3. Specifically, the area of the red color filter 11 in the pixel unit 1 is larger than that of the red color filter 21 in the pixel unit 2, and the area of the red color filter 21 in the pixel unit 2 is larger than that of the red color filter 31 in the pixel unit 3; the area of the green color filter 12 in the pixel unit 1 is larger than that of the green color filter 22 in the pixel unit 2, and the area of the green color filter 22 in the pixel unit 2 is larger than that of the green color filter 32 in the pixel unit 3.

In the pixel unit close to the first side of the first base substrate 10, the area of any one of the color filters of other colors is larger than that of the color filter of the specific color. In the present embodiment, for example, the areas of the color filters of the specific color in different pixel units may be the same. As shown in FIG. 4, the blue color filter 13, the blue color filter 23 and the blue color filter 33 have the same area. In the pixel unit 1 close to the first side of the first base substrate 10, the area of the red color filter 11 is larger than that of the blue color filter 13 and the area of the green color filter 12 is larger than that of the blue color filter 13. For example, in the pixel unit 1 close to the first side of the first base substrate 10, the ratio of the area of the color filter of the specific color to that of any one of the color filters of other colors is smaller than 1 and larger than or equal to 0.94. As shown in FIG. 4, in the pixel unit 1 close to the first side of the first base substrate 10, the ratio of the area of the blue color filter 13 to that of the red color filter 11 is smaller than 1 and larger than or equal to 0.94, and the ratio of the area of the blue color filter 13 to that of the green color filter 12 is smaller than 1 and larger than or equal to 0.94.

In the pixel unit 3 close to the second side of the first base substrate 10, the area of any one of the color filters of other colors is smaller than that of the color filter of the specific color. As shown in FIG. 4, in the pixel unit 3 close to the second side of the first base substrate 10, the ratio of the area of the blue color filter 33 to that of the red color filter 31 is larger than 1 and smaller than or equal to 1.07, and the ratio of the area of the blue color filter 33 to that of the green color filter 32 is larger than 1 and smaller than or equal to 1.07.

In the pixel unit located midway between the first side and the second side, the area of a color filter of the specific color is equal to that of any one of the color filters of other colors. As shown in FIG. 4, in the pixel unit 2 located midway between the first side and the second side, the area of the blue color filter 23 is equal to that of the red color filter 21, and equal to that of the green color filter 22.

To sum up, an area of a red color filter is decreased gradually from the red color filter 11 in the pixel unit 1 close to the first side of the first base substrate 10 towards the red color filter 31 in the pixel unit 3 close to the second side of the first base substrate 10, and an area of a green color filter is decreased gradually from the green color filter 12 in the pixel unit 1 close to the first side of the first base substrate 10 towards the green color filter 32 in the pixel unit 3 close to the second side of the first base substrate 10, while the areas of the blue color filters in the pixel units are equal to each other (i.e., the area of the blue color filter remains unchanged). Therefore, it is achieved that the ratio of the area of the blue color filter to that of the red color filter is increased gradually and the ratio of the area of the blue color filter to that of the green color filter is increased gradually, from the pixel unit 1 close to the first side of the first base substrate 10 towards the pixel unit 3 close to the second side of the first base substrate 10 opposite to the first side.

In the present embodiment, when the color filter substrate is applied to the light guide plate, the areas of the red and green color filters are decreased gradually from the first side of the first base substrate 10 (the light incoming side of the light guide plate 4) towards the second side of the first base substrate 10 (the side of the light guide plate far from the light source). Thus, the transmittance of the blue light is increased gradually, which compensates for the color shift of the light guide plate, and thereby alleviating the color shift phenomenon of a display device.

In the technical solution of the color filter substrate provided by the present embodiment, from a pixel unit close to a first side of the first base substrate towards a pixel unit close to a second side of the first base substrate opposite to the first side, a ratio of an area of a color filter of a specific color to that of any one of color filters of other colors is increased gradually, thereby the color filter of the specific color compensates for the color shift of the light guide plate, alleviating the color shift phenomenon of a display device, and thus improving the image quality of the display device.

The third embodiment of the present application provides an array substrate comprising a second base substrate and a plurality of pixel units provided above the second base substrate, each of the pixel units comprising color filters of various colors; from a pixel unit close to a first side of the second base substrate towards a pixel unit close to a second side of the second base substrate opposite to the first side, a ratio of an area of a color filter of a specific color to that of any one of color filters of other colors is increased gradually.

In the present embodiment, the descriptions for the pixel units, the color filters of the specific color and the color filters of other colors are the same as those in the first or the second embodiment and may reference to the first or the second embodiment as described above, which will not be repeated here.

In the technical solution of the array substrate provided by the present embodiment, from a pixel unit close to a first side of the first base substrate towards a pixel unit close to a second side of the first base substrate opposite to the first side, a ratio of an area of a color filter of a specific color to that of any one of color filters of other colors is increased gradually, thereby the color filter of the specific color compensates for the color shift of the light guide plate, alleviating the color shift phenomenon of a display device, and thus improving the image quality of the display device.

The fourth embodiment of the present application provides a display panel comprising an array substrate and a color filter substrate arranged opposite to each other, wherein the color filter substrate may be the color filter substrate of the first or the second embodiment as described above; or a display panel comprising a color filter substrate and a array substrate opposite to each other, wherein the array substrate may be the array substrate of the third embodiment as described above.

In the present embodiment, the display panel is a liquid crystal display panel, and thus there is a liquid crystal layer provided between the color filter substrate and the array substrate.

In the technical solution of the display panel provided by the present embodiment, from a pixel unit close to a first side of the first base substrate towards a pixel unit close to a second side of the first base substrate opposite to the first side, a ratio of an area of a color filter of a specific color to that of any one of color filters of other colors is increased gradually, thereby the color filter of the specific color compensates for the color shift of the light guide plate, alleviating the color shift phenomenon of a display device, and thus improving the image quality of the display device.

Figure 5:
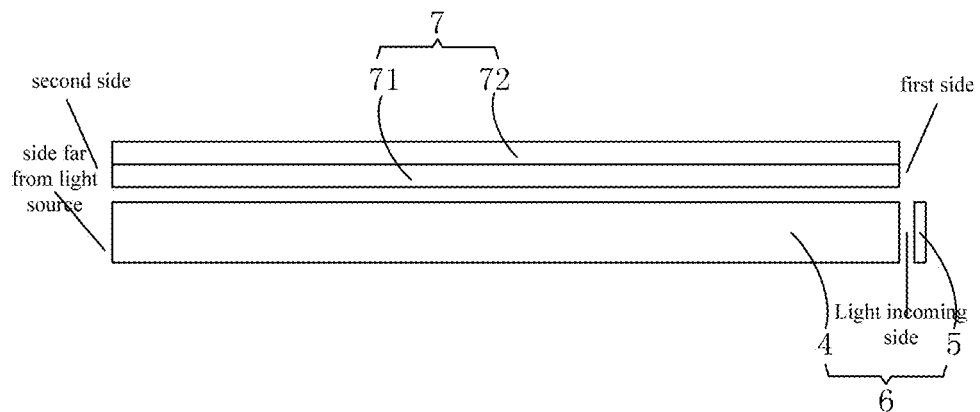
FIG. 5 is a structural diagram of a display device provided by a fourth embodiment of the present application.

FIG. 5 is a structural diagram of a display device provided by the fourth embodiment of the present application. As shown in FIG. 5, the display device comprises a backlight assembly 6 and a display panel 7. The backlight assembly 6 comprises a light source 5 and a light guide plate 4. The display panel 7 comprises an array substrate 71 and a color filter substrate 72 arranged opposite to each other. The light source 5 is located at the light incoming side of the light guide plate 4.

In a case that the color filter substrate 72 is the color filter substrate of the first or the second embodiment as described above, the light incoming side of the light guide plate 4 is arranged so as to be close to the first side of the first base substrate 10; or, in a case that the array substrate is the array substrate of the third embodiment as described above, the light incoming side of the light guide plate 4 is arranged so as to be close to the first side of the second base substrate.

In the present embodiment, the light source 5 is a LED light bar.

In the present embodiment, a material of the light guide plate 4 is PMMA. In the practical application, the light guide plate 4 may be formed by other materials, such as glass.

Figure 6:
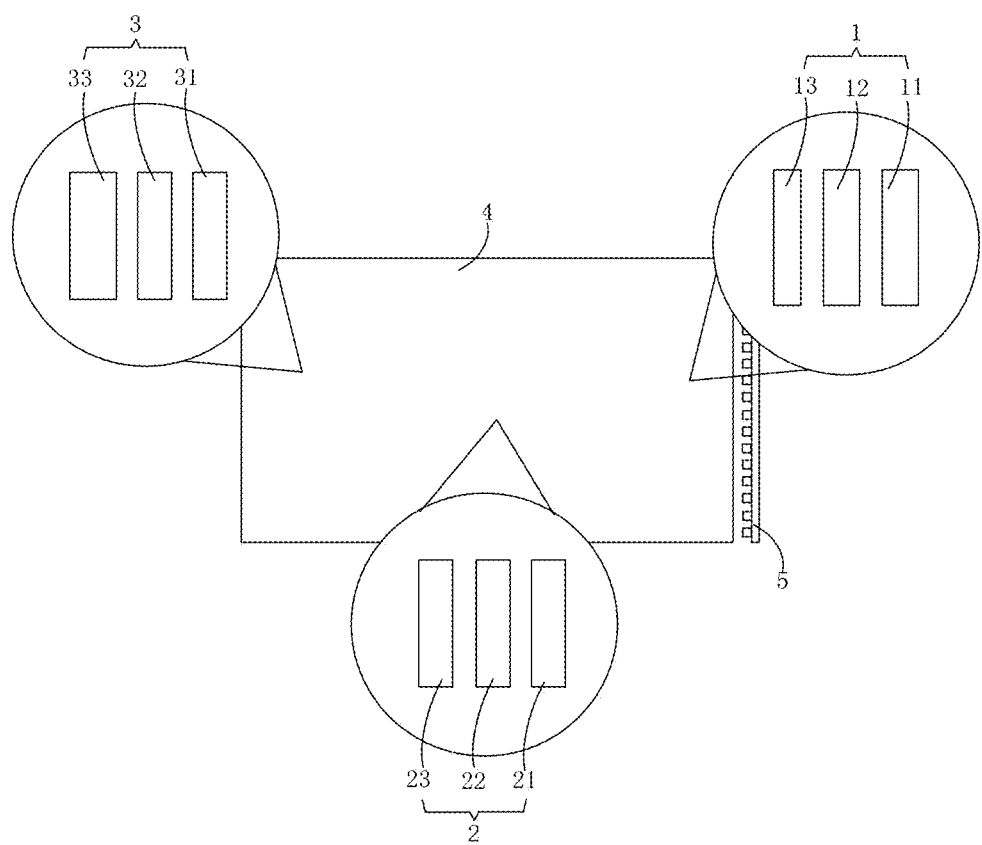
FIG. 6 is a diagram showing a positional correspondence between color filters of the color filter substrate in FIG. 3 and the light guide plate.

FIG. 6 is a diagram showing a positional correspondence relationship between color filters of the color filter substrate in FIG. 3 and the light guide plate. As shown in FIGS. 3, 5 and 6, since the light incoming side of the light guide plate 4 is arranged so as to be close to the first side of the first base substrate 10, the side far from the light source of the light guide plate 4 is arranged so as to be close to the second side of the first base substrate 10. As the pixel unit 1 is close to the light incoming side of the light guide plate 4, the blue color filter 13 in the pixel unit 1 is then close to the light incoming side of the light guide plate 4; as the pixel unit 3 is close to the side far from the light source of the light guide plate 4, the blue color filter 33 in the pixel unit 3 is then close to the side far from the light source of the light guide plate 4; as the pixel unit 2 is located midway between the light incoming side and the side far from the light source of the light guide plate 4, the blue color filter 23 in the pixel unit 2 is then located midway between the light incoming side and the side far from the light source of the light guide plate 4. The area of the blue color filter is increased gradually from the light incoming side towards the side far from the light source of the light guide plate 4, causing the transmittance of the blue light to be increased gradually, which compensates for the color shift of the light guide plate, and thereby alleviating the color shift phenomenon of a display device. By a simulation experiment with respect to the display device in FIG. 6, when a ratio of an area of a blue color filter 13 close to the light incoming side to that of a blue color filter 33 close to the side far from the light source is 1:1.138 and a light source with the same optical spectrum is employed, the difference in blue color $\Delta v'$ between the light incoming side and the side far from the light source of the light guide plate 4 is smaller than or equal to 0.007 ($\Delta v' \leq 0.007$). Thus, the difference in blue color between the light incoming side and the side far from the light source of the light guide plate 4 is reduced substantially, thereby achieving the compensation for the color shift of the light guide plate 4.

Figure 7:
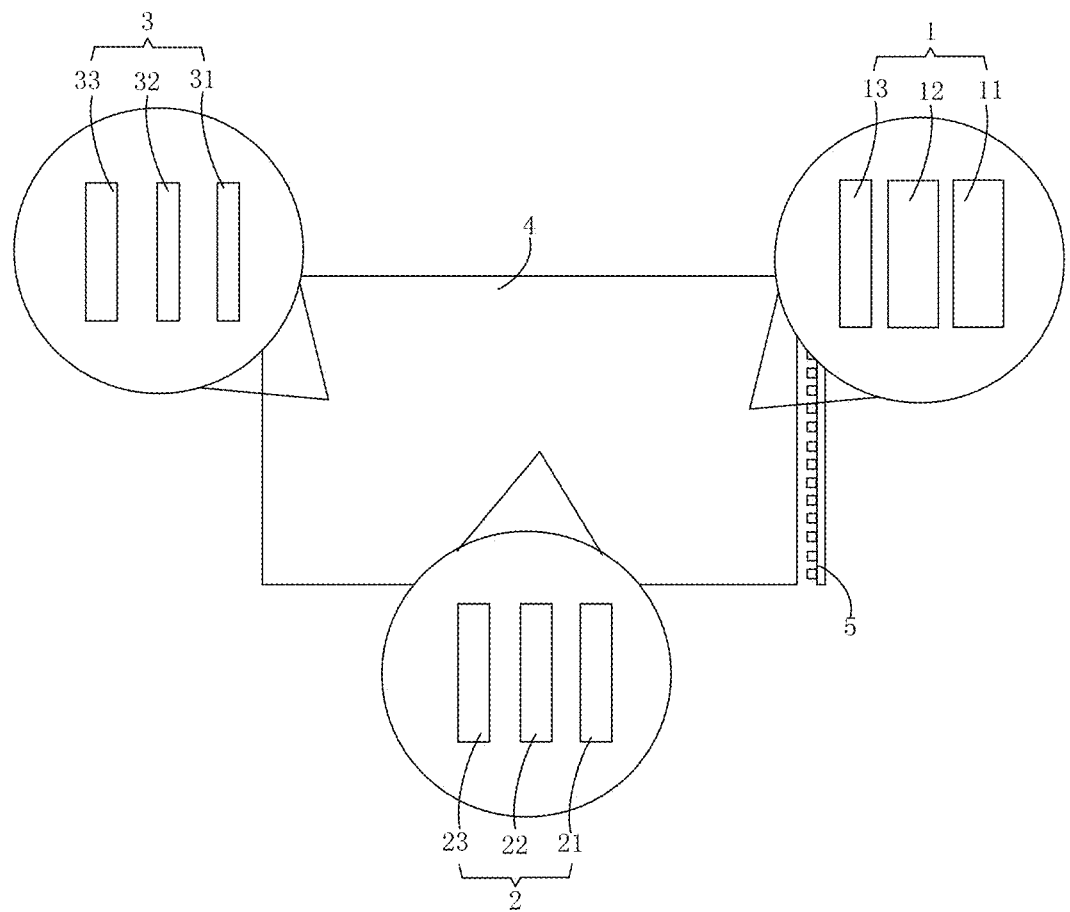
FIG. 7 is a diagram showing another positional correspondence between color filters of the color filter substrate in FIG. 4 and the light guide plate.

FIG. 7 is a diagram showing another positional correspondence relationship between color filters of the color filter substrate in FIG. 4 and the light guide plate. As shown in FIGS. 4, 5 and 7, since the light incoming side of the light guide plate 4 is arranged so as to close to the first side of the first base substrate 10, the side far from the light source of the light guide plate 4 is arranged so as to correspond to the first side of the second base substrate 10. As the pixel unit 1 is close to the light incoming side of the light guide plate 4, the blue color filter 13 in the pixel unit 1 is then close to the light incoming side of the light guide plate 4; as the pixel unit 3 is close to the side far from the light source of the light guide plate 4, the blue color filter 33 in the pixel unit 3 is then close to the side far from the light source of the light guide plate 4; as the pixel unit 2 is located midway between the light incoming side and the side far from the light source of the light guide plate 4, the blue color filter 23 in the pixel unit 2 is then located midway between the light incoming side and the side far from the light source of the light guide plate 4. The areas of the red and green color filters are decreased gradually from the light incoming side towards the side far from the light source of the light guide plate 4, causing the transmittance of the blue light to be increased gradually, which compensates for the color shift of the light guide plate 4, and thereby alleviating the color shift phenomenon of a display device. By a simulation experiment with respect to the display device in FIG. 7, when a ratio of an area of a red color filter 11 close to the side far from the light source to that of a red color filter 31 close to the light incoming side is 1:1.138 and a ratio of an area of a green color filter 12 close to the side far from the light source to that of a green color filter 32 close to the light incoming side is 1:1.138, and a light source with the same optical spectrum is employed, the difference in blue color $\Delta v'$ between the light incoming side and the side far from the light source of the light guide plate 4 is smaller than or equal to 0.007 ($\Delta v' \leq 0.007$). Thus, the difference in blue color between the light incoming side and the side far from the light source of the light guide plate 4 is reduced substantially, thereby achieving the compensation for the color shift of the light guide plate 4.

In the technical solution of the display device provided by the present embodiment, from a pixel unit close to a first side of the first base substrate towards a pixel unit close to a second side of the first base substrate opposite to the first side, a ratio of an area of a color filter of a specific color to that of any one of color filters of other colors is increased gradually, thereby the color filter of the specific color compensates for the color shift of the light guide plate, alleviating the color shift phenomenon of the light guide plate and in turn that of the display device, and thus improving the image quality of the display device.

It will be appreciated that the above embodiments are exemplary implementations for the purpose of illustrating the principle of the present application only, and the present application is not limited thereto. It will be apparent to a person skilled in the art that many variations and modifications may be made without departing from the spirit and essence of the present application. These variations and modifications should also be considered as the protective scope of the present application.

What is claimed is:

1. A color filter substrate comprising a first base substrate and a plurality of pixel units provided above the first base substrate, each of the pixel units comprising color filters of various colors; a first pixel unit, a second pixel unit and a third pixel unit are arranged side by side in a direction from a first side of the first base substrate towards a second side of the first base substrate opposite to the first side, a ratio of an area of a color filter of a specific color to that of any one of color filters of other colors in the first pixel unit is lower than a ratio of an area of a color filter of the specific color to that of the any one of the color filters in the second pixel unit, and the ratio of the area of the color filter of the specific color to that of the any one of color filters of the other colors in the second pixel unit is lower than a ratio of an area of a color filter of the specific color to that of the any one of the color filters in the third pixel unit.

2. The color filter substrate of claim 1, wherein, in a direction from the first side of the first base substrate towards the second side of the first base substrate, the area of the color filter of the specific color is increased gradually.

3. The color filter substrate of claim 2, wherein, in the first pixel unit, the area of the color filter of the specific color is smaller than that of any one of the color filters of other colors.

4. The color filter substrate of claim 3, wherein, in the first pixel unit, the ratio of the area of the color filter of the specific color to that of any one of the color filters of other colors is smaller than 1 and larger than or equal to 0.94.

5. The color filter substrate of claim 2, wherein, in the third pixel unit, the area of the color filter of the specific color is larger than that of any one of the color filters of other colors.

6. The color filter substrate of claim 5, wherein, in the third pixel unit, the ratio of the area of the color filter of the specific color to that of any one of the color filters of other colors is larger than 1 and smaller than or equal to 1.07.

7. The color filter substrate of claim 2, wherein a ratio of an area of a blue color filter close to the first side to that of a blue color filter close to the second side is 1:1.138.

8. The color filter substrate of claim 1, wherein, in a direction from the first side of the first base substrate towards the pixel unit close to the second side of the first base substrate, the area of any one of the color filters of other colors is decreased gradually.

9. The color filter substrate of claim 8, wherein, in the first pixel unit, the area of any one of the color filters of other colors is larger than that of the color filter of the specific color.

10. The color filter substrate of claim 9, wherein, in the first pixel unit, the ratio of the area of the color filter of the specific color to that of any one of the color filters of other colors is smaller than 1 and larger than or equal to 0.94.

11. The color filter substrate of claim 8, wherein, in the third pixel unit, the area of any one of the color filters of other colors is smaller than that of the color filter of the specific color.

12. The color filter substrate of claim 11, wherein, in the third pixel unit, the ratio of the area of the color filter of the specific color to that of any one of the color filters of other colors is larger than 1 and smaller than or equal to 1.07.

13. The color filter substrate of claim 1, wherein, in the second pixel unit, an area of a color filter of the specific color is equal to that of any one of the color filters of other colors.

14. The color filter substrate of claim 1, wherein the color filter of the specific color is a blue color filter; and/or the color filters of various colors also comprise a green color filter and a red color filter.

15. The color filter substrate of claim 1, wherein the color filters of various colors are rectangular.

16. A display panel comprising an array substrate and the color filter substrate of claim 1 arranged opposite to each other.

17. A display device comprising a backlight assembly and the display panel of claim 16, the backlight assembly comprising a light source and a light guide plate, the light source being located at a light incoming side of the light guide plate; the light incoming side of the light guide plate is arranged so as to be close to the first side of the first base substrate.

* * * * *